US010623105B2

(12) United States Patent
Schmogrow et al.

(10) Patent No.: US 10,623,105 B2
(45) Date of Patent: Apr. 14, 2020

(54) ASYNCHRONOUS BIAS CONTROL FOR AN OPTICAL MODULATOR USING A MULTIPLE TONE DETECTION TECHNIQUE WITH PHASE CORRECTION

(71) Applicant: Infinera Corporation, Annapolis Junction, MD (US)

(72) Inventors: Rene Marcel Schmogrow, Santa Clara, CA (US); Arseny Vasilyev, San Jose, CA (US); Charles Chen, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/094,321

(22) Filed: Apr. 8, 2016

(65) Prior Publication Data

US 2017/0294967 A1 Oct. 12, 2017

(51) Int. Cl.
*H04B 10/50* (2013.01)

(52) U.S. Cl.
CPC . *H04B 10/50575* (2013.01); *H04B 2210/075* (2013.01)

(58) Field of Classification Search
CPC .................................................. H04B 10/516
USPC ........................................ 398/140, 182, 48
See application file for complete search history.

(56) References Cited

U.S. PATENT DOCUMENTS

| 5,444,468 | A | * | 8/1995 | Fukushima | B41J 2/01 347/14 |
| 5,844,193 | A | * | 12/1998 | Nomura | B23K 11/24 219/110 |
| 2002/0181358 | A1 | * | 12/2002 | Sako | G11B 7/005 369/47.24 |
| 2009/0060528 | A1 | * | 3/2009 | Takashima | H04B 10/505 398/186 |
| 2010/0117730 | A1 | * | 5/2010 | Kawai | H03F 3/2173 330/251 |
| 2011/0025887 | A1 | * | 2/2011 | Kobayashi | G09G 3/22 348/241 |
| 2012/0155865 | A1 | * | 6/2012 | Kawakami | G02F 1/0123 398/43 |
| 2014/0233963 | A1 | * | 8/2014 | Le Taillandier De Gabory | H04B 10/541 398/183 |
| 2015/0236792 | A1 | * | 8/2015 | Sugihara | H04B 10/564 398/183 |
| 2018/0269980 | A1 | * | 9/2018 | Koga | G02F 1/01 |
| 2019/0158187 | A1 | * | 5/2019 | Koga | G02F 1/0123 |

* cited by examiner

Primary Examiner — Omar S Ismail
(74) Attorney, Agent, or Firm — David L. Soltz

(57) ABSTRACT

In an asynchronous optical modulation system, a drive circuit may generate a plurality of dither tones in accordance with a predetermined dither frequency ratio. Based on the components of the dither frequency ratio, the optical modulation system may be configured to determine a feedback signal magnitude component that is independent of the delay τ and a feedback signal sign component that is also independent of the delay τ. A feedback signal that is independent of the delay τ can then be reconstructed based on the feedback signal magnitude component and the feedback signal sign component.

20 Claims, 8 Drawing Sheets

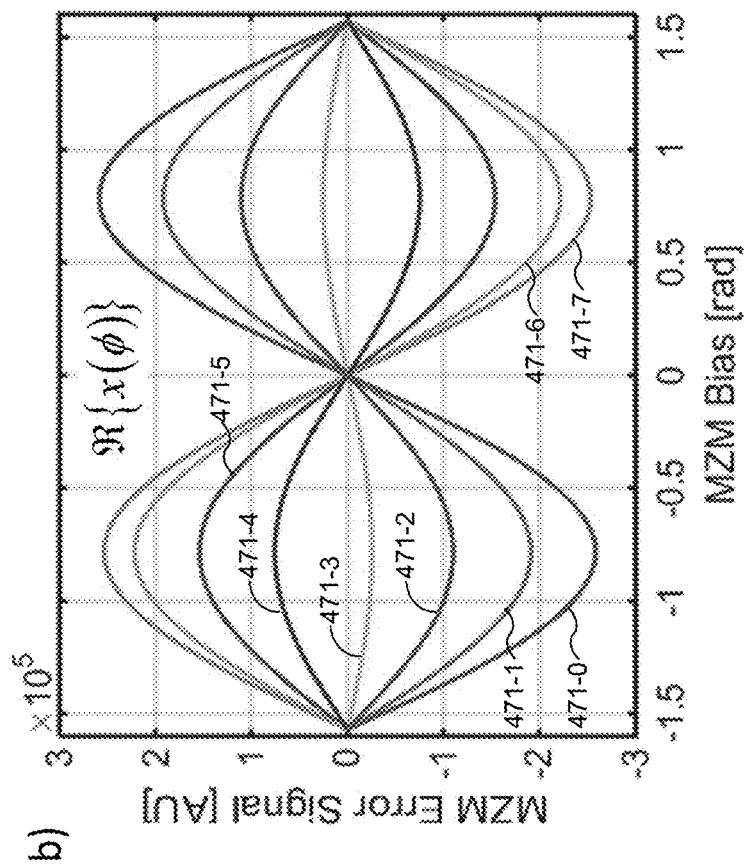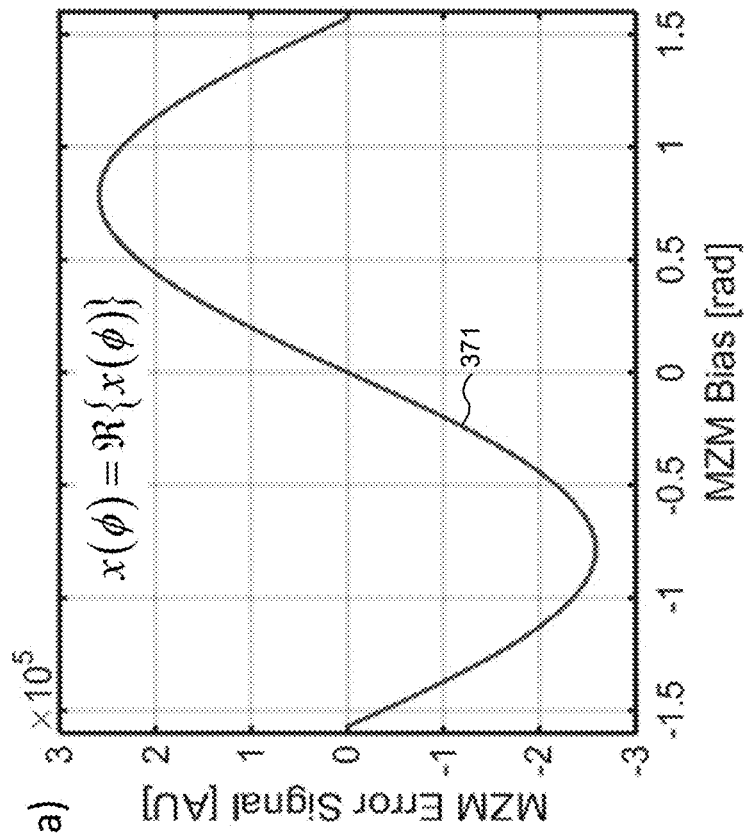
FIG. 4
FIG. 3

ASYNCHRONOUS BIAS CONTROL FOR AN OPTICAL MODULATOR USING A MULTIPLE TONE DETECTION TECHNIQUE WITH PHASE CORRECTION

BACKGROUND

Aspects of this disclosure relate generally to communication systems, and more particularly to asynchronous bias control for an optical modulator.

Optical signals are increasingly used to communicate data in telecommunication systems. Optical communication systems are capable of high-speed data transfer. Moreover, optical signals are generally of high quality because, for example, they are not distorted by electromagnetic fields.

Optical modulation systems may be used to convert an electrical data signal into a phase-modulated and amplitude-modulated optical signal. However, optical modulation systems generally rely on bias control to optimize performance. To control bias, the optical modulation system may include a drive circuit that generates a low-frequency dither signal. The optical modulation system superimposes the generated dither signal onto the electrical data signal. The electrical data signal (having the dither signal superimposed thereon) is then provided to the optical modulator and converted to an optical data signal.

An optical modulator preferably operates at a null transmission point. Any deviation from the null transmission point may lead to degradation of the optical data signal. This deviation may be referred to as a bias $\phi$. For example, the transmission point of the optical modulator may shift due to environmental factors (for example, excess heat) or due to aging of the optical modulator.

To control the bias $\phi$, the optical modulation system may generate a feedback signal. In particular, the optical modulation system taps a portion of the optical data signal generated by the optical modulator. The optical modulation system further includes a detector circuit that recovers the dither signal from the tapped optical data signal. The detector circuit then compares the recovered dither signal obtained from the optical data signal to the generated dither signal generated by the drive circuit. Based on the comparison, the detector circuit can determine the bias $\phi$ and generate a feedback signal for transmission to the optical modulator. The optical modulator may then adjust the transmission point based on the feedback signal.

As a practical matter, the value of the bias $\phi$ may be obscured by a delay $\tau$ caused by processing of the dither signal (for example, processing and conversion delay as the dither signal passes through the optical modulator). For ease of comparison, a synchronous optical modulation system may provide the generated dither signal to the detector circuit, thereby synchronizing the drive circuit with the detector circuit. Because the optical modulation system is synchronized, the detector circuit can account for any delay ($\tau$) caused by processing or conversion of the dither signal as it passes through the optical modulator. Once the delay $\tau$ is accounted for, the bias $\phi$ can be determined independently of the delay $\tau$.

However, in asynchronous optical modulation systems the dither signal generated by the drive circuit is not provided to the detector circuit. Accordingly, a need arises for generating a feedback signal that is independent of the delay $\tau$ without relying on synchronization.

SUMMARY

The following summary is an overview provided solely to aid in the description of various aspects of the disclosure and is provided solely for illustration of the aspects and not limitation thereof.

In one example, a transmitter is disclosed. The transmitter may include, for example, a drive circuit that supplies at least one drive signal, and a modulation circuit that receives the at least one drive signal, the modulation circuit receiving light and outputting a modulated optical signal based on the at least one drive signal, the modulated optical signal carrying first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer.

In another example, another transmitter is disclosed. The transmitter may include, for example, a drive circuit that supplies at least one drive signal, a modulation circuit that receives the at least one drive signal, the modulation circuit receiving light and outputting a modulated optical signal based on the at least one drive signal, the modulated optical signal carrying first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer, and a photodetector that detects a portion of the modulated optical signal, and a detector circuit that supplies a feedback signal that is supplied to the modulation circuit.

In yet another example, another transmitter is disclosed. The transmitter may include, for example, a modulation circuit that receives at least one drive signal, the modulation circuit receiving light and outputting a modulated optical signal based on the at least one drive signal, the modulated optical signal carrying first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer, and a photodetector that detects a portion of the modulated optical signal, and a detector circuit that supplies a feedback signal that is supplied to the modulation circuit, wherein the feedback signal generated is based on a first optical signal component associated with the first frequency and a second optical signal component associated with the second frequency, wherein the modulator circuit adjusts a transmission point of the modulator circuit based on the feedback signal.

BRIEF DESCRIPTION OF THE DRAWINGS

The accompanying drawings are presented to aid in the description of various aspects of the disclosure and are provided solely for illustration of the aspects and not limitation thereof.

FIG. 3 generally illustrates a feedback signal as a function of the optical modulator bias.

FIG. 4 generally illustrates an array of potential feedback signals caused by a delay τ that is constant but unknown.

DETAILED DESCRIPTION

Figure 1:
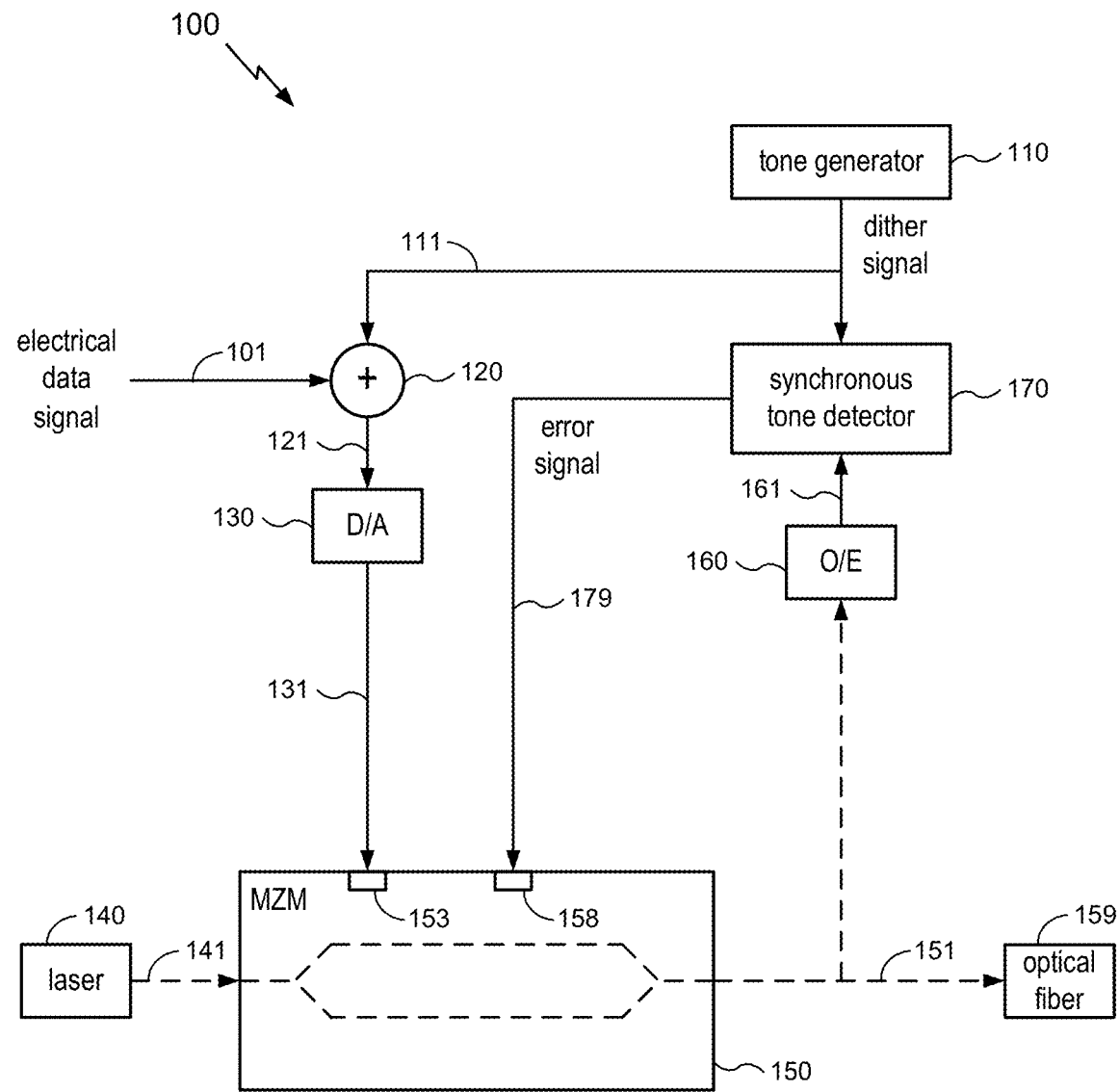
FIG. 1 generally illustrates an optical modulation system having synchronous bias control.

The present disclosure relates generally to communication systems, and more particularly to asynchronous bias control in an optical modulator.

An optical modulation system may include a drive circuit that adds a low-frequency dither signal to a data signal, an optical modulator that generates an optical data signal, and a detector circuit that recovers the dither signal from the optical data signal of the optical modulator. The recovered dither signal may used to generate a feedback signal used for bias control of the optical modulator. In a synchronous optical modulation system, the drive circuit may provide the generated dither signal to the detector circuit so that the detector circuit can account for the delay τ caused by transmission of the generated dither signal to and/or through the optical modulator. Otherwise, the delay τ may obscure the value of the bias φ and therefore distort the feedback signal.

In an asynchronous optical modulation system, the generated dither signal may not be provided to the detector circuit. Accordingly, the delay τ must be accounted for in other ways. In accordance with an aspect of the disclosure, the drive circuit may generate a plurality of dither tones in accordance with a predetermined dither frequency ratio that relates, for example a first frequency associated with the first dither signal to a second frequency associated with the second dither signal. Based on the components of the dither frequency ratio, the asynchronous optical modulation system may be configured to determine a feedback signal that accurately reflects the bias φ, that is, a feedback signal that is independent of the delay τ. In particular, mathematical techniques (described in greater detail below) are used by the detector circuit to generate a feedback signal magnitude component that is independent of the delay τ and a feedback signal sign component that is also independent of the delay τ. The detector circuit can then generate a feedback signal that is independent of the delay τ based on the feedback signal magnitude component and the feedback signal sign component.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described in the present disclosure may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 generally illustrates an optical modulation system 100 having synchronous bias control. The optical modulation system 100 may be provided with a data signal 101. The data signal 101 may be an electrical or electronic data signal. The data signal 101 may be an analog or digital signal. The optical modulation system 100 may further include a drive circuit 110 that generates a dither signal 111. The dither signal 111 may be, for example, a sinusoid associated with a particular selected frequency. As will be explained in greater detail below, the drive circuit 110 may facilitate bias control. The dither signal 111 may be a function of time t and may be denoted d(t). The dither signal 111 may have an amplitude A and a frequency ω, as shown in Equation 1:

$$d(t)=A \cos(\omega t) \quad \text{Eq. (1)}$$

The data signal 101 and dither signal 111 may be provided to a signal adder 120, which adds the dither signal 111 to the data signal 101 to generate a sum signal 121. As shown in FIG. 1, the sum signal 121 may then be converted by digital-to-analog converter 130 to modulating signal 131. However, it will be understood that if the sum signal 121 is an analog signal, then the digital-to-analog converter 130 may be omitted.

The optical modulation system 100 may further include a laser 140. The laser 140 may generate an optical carrier signal 141, for example, a continuous-wave laser, that is provided to an optical modulator 150. The optical modulator 150 may be, for example, a Mach-Zehnder Modulator (MZM). The optical modulator 150 may receive the modulating signal 131 at a modulating signal electrode 153. Based on the modulating signal 131 received at the modulating signal electrode 153, the optical modulator 150 may modulate the optical carrier signal 141 to generate an optical data signal 151. The optical data signal 151 may be an output of the optical modulation system 100 and may be provided to an element of an external optical communications system, for example, optical fiber 159.

As will be described in greater detail below, the optical modulator 150 preferably operates at a null transmission point. Any deviation from the null transmission point may lead to degradation of the optical data signal 151. This deviation may be referred to as a bias ϕ. For example, the transmission point of the optical modulator 150 may shift due to environmental factors (for example, excess heat) or due to aging of the optical modulator 150.

The optical modulation system 100 may prevent degradation of the optical data signal 151 by recovering the dither signal 111 from the optical data signal 151, correlating the recovered dither signal with the original dither signal 111, and generating a feedback signal that facilitates adjusting of the bias ϕ.

In particular, a portion of the optical data signal 151 may be tapped and provided to a photodetector 160. The photodetector 160 may then generate a photocurrent 161 based on the optical data signal 151. The photocurrent 161 may be filtered and/or demodulated so as to recover the dither signal from the photocurrent 161. Accordingly, the photocurrent 161 may have a component of interest around a frequency ω (the same frequency ω as the dither signal 111). The photocurrent component may be a function of time t and may be denoted i(t). The photocurrent component may have an amplitude α, and a bias ϕ, as shown in Equation 2:

$$i(t) = a \cos(\omega t + \phi). \qquad \text{Eq. (2)}$$

It will be understood that a "photocurrent" as referred to herein may refer, depending on the context, to a particular component of the photocurrent relating to a specific frequency, as shown in Equation 2. For example, photocurrent 161 may refer to a particular component of the photocurrent relating to frequency ω. The photocurrent 161 may include additional components, for example, components associated with the data signal 101, but for simplicity these are omitted from Equation 2.

The bias ϕ that appears in the photocurrent 161 (as shown in Equation 2) may represent a bias of the optical modulator 150 caused by deviation of the transmission point. The photocurrent 161 may be provided to a synchronous detector circuit 170 so that the synchronous detector circuit 170 can generate a feedback signal 179 representative of the bias ϕ. The synchronous detector circuit 170 may obtain a recovered dither signal from the photocurrent 161 by demodulating the photocurrent 161 in accordance with the known frequency ω of the dither signal 111.

Moreover, as shown in FIG. 1, the dither signal 111 may be provided to the synchronous detector circuit 170 directly from the drive circuit 110. Accordingly, the synchronous detector circuit 170 may also determine an amplitude difference and a phase difference between the dither signal 111 (provided by the drive circuit) and the recovered dither signal (obtained from the photocurrent 161). Together with an appropriate calibration, the detected phase and amplitude may be used to recover the modulator bias ϕ.

Based on the amplitude α of the recovered dither signal and the indicated bias ϕ, the synchronous detector circuit 170 may generate the feedback signal 179 representative of the bias ϕ. The feedback signal 179 may be denoted as a complex-valued variable x, as shown in Equation 3:

$$x(\Phi) = A \sin 2\phi. \qquad \text{Eq. (3)}$$

The feedback signal 179 may then be provided to a feedback signal electrode 158 of the optical modulator 150 in order to adjust the transmission point of the optical modulator 150. For example, the optical modulator 150 may use the feedback signal 179 to adjust the bias ϕ, such that the feedback signal x(ϕ) tends toward zero.

Figure 2A:
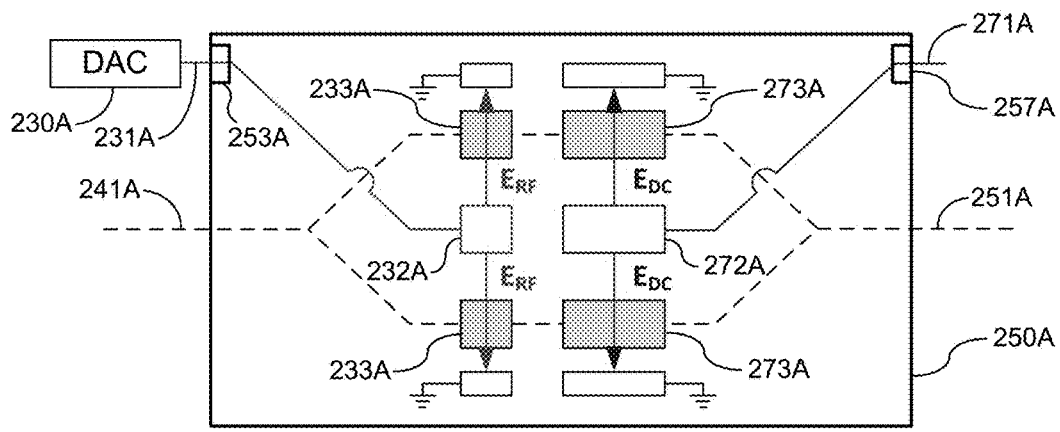
FIG. 2A generally illustrates a push-pull optical modulator.

FIG. 2A generally illustrates a push-pull optical modulator 250A. The push-pull optical modulator 250A may be similar in some respects to the optical modulator 150 depicted in FIG. 1 or to any other optical modulator in the present application.

The push-pull optical modulator 250A may include a modulating signal electrode 253A that receives a modulating signal 231A from a digital-to-analog converter 230A. The push-pull optical modulator 250A may include a modulating signal electrode 253A that receives a modulating signal 231A from a digital-to-analog converter 230A. The push-pull optical modulator 250A may further receive an optical carrier signal 241A and may generate an optical data signal 251A. Moreover, the push-pull optical modulator 250A may include a feedback signal electrode 257A configured to receive a feedback signal 271A. These elements may be similar in some respects to analogous elements depicted in FIG. 1 or in any other optical modulator in the present application.

As depicted in FIG. 2A, the push-pull optical modulator 250A may include a modulating field generator 232A. The modulating field generator 232A may apply, for example, an electric field across each arm of the push-pull optical modulator 250A. For example, the modulating field generator 232A may apply an electric field $E_{RF}$ to the respective arms of the push-pull optical modulator 250A at respective modulation points 233A.

As further depicted in FIG. 2A, the push-pull optical modulator 250A may include a bias control field generator 272A. The bias control field generator 272A may apply, for example, an electric field across each arm of the push-pull optical modulator 250A. For example, the bias control field generator 272A may apply an electric field $E_{DC}$ to the respective arms of the push-pull optical modulator 250A at respective bias control points 273A.

Figure 2B:
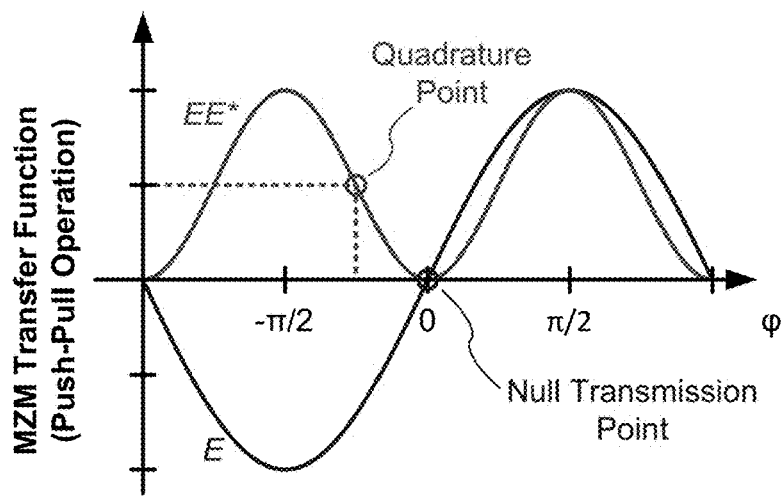
FIG. 2B generally illustrates an example transfer function of a push-pull optical modulator.

FIG. 2B generally illustrates an example transfer function of a push-pull optical modulator such as, for example, the push-pull optical modulator 250A depicted in FIG. 2A. The push-pull optical modulator 250A preferably operates at a null transmission point. FIG. 2B shows a transfer function wherein the signal E and the signal EE* both have a phase of zero. Accordingly, the push-pull optical modulator 250A is operating at the null transmission point. Any deviation from the null transmission point may lead to degradation of the optical data signal 151. This deviation may be referred to as a bias ϕ. The transfer function also shows a quadrature point at −π/4.

As noted above, the bias ϕ may arise due to age, environment, or other factors. However, the bias ϕ may be detected based on an output of the optical modulator 250A and a feedback signal can be provided to the optical modulator 250A. The optical modulator 250A may receive the feedback signal and adjust the transmission point of the optical data signal.

Figure 2C:
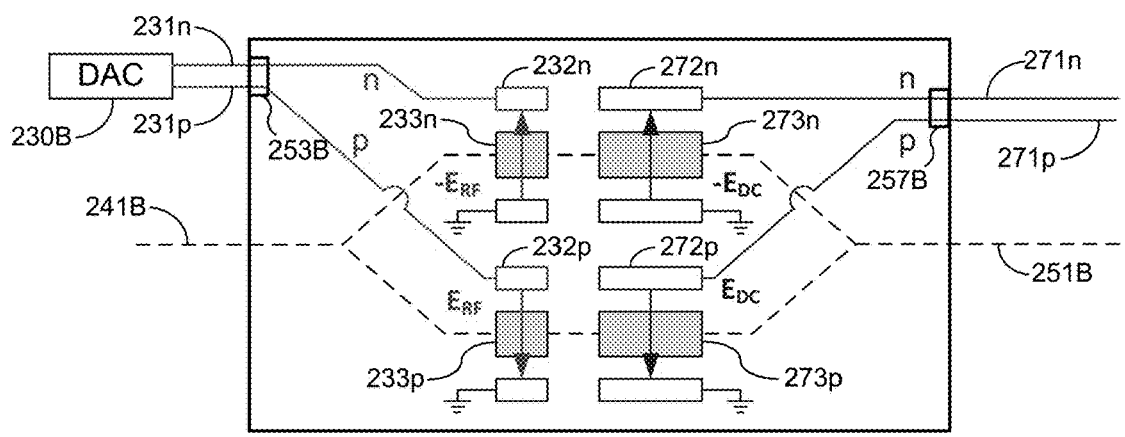
FIG. 2C generally illustrates a dual-drive optical modulator.

FIG. 2C generally illustrates a dual-drive optical modulator 250B. The dual-drive optical modulator 250B may be similar in some respects to the optical modulator 150 depicted in FIG. 1 or to any other optical modulator in the present application.

The dual-drive optical modulator 250B may include modulating signal electrodes 253B that receive a positive dual-drive modulating signal 231p and a negative dual-drive modulating signal 231n, respectively, from one or more digital-to-analog converters 230B. The dual-drive optical modulator 250B may further receive an optical carrier signal 241B and may generate an optical data signal 251B. Moreover, the dual-drive optical modulator 250B may include feedback signal electrodes 257B configured to receive a positive feedback signal 271p and a negative feedback signal 271n. These elements may be similar in some respects to analogous elements depicted in FIG. 1 or in any other optical modulator in the present application.

However, it will be understood that the dual-drive optical modulator 250B depicted in FIG. 2C differs from the push-pull optical modulator 250A depicted in FIG. 2A at least because it receives differential modulating signals and differential feedback signals. For example, the positive dual-drive modulating signal 231p and the negative dual-drive modulating signal 231n may be equal and opposite, and the positive dual-drive modulating signal 231p and negative dual-drive modulating signal 231n may be collectively referred to as differential modulating signals. Similarly, the positive feedback signal 271p and the negative feedback signal 271n may be equal and opposite and may be referred to as differential feedback signals.

As depicted in FIG. 2C, the dual-drive optical modulator 250B may include a positive modulating field generator 232p and a negative modulating field generator 232n. The positive modulating field generator 232p may apply, for example, an electric field $E_{RF}$ across a first arm of the dual-drive optical modulator 250B at a modulation point 233p. The negative modulating field generator 232n may apply, for example, an electric field $-E_{RF}$ across a second arm of the dual-drive optical modulator 250B at a modulation point 233n.

As further depicted in FIG. 2C, the dual-drive optical modulator 250B may include a positive bias control field generator 272p and a negative bias control field generator 272n. The positive bias control field generator 272p may apply, for example, an electric field $E_{DC}$ across the first arm of the dual-drive optical modulator 250B at a modulation point 273p. The negative bias control field generator 272n may apply, for example, an electric field $-E_{DC}$ across the second arm of the dual-drive optical modulator 250B at a modulation point 273n.

It will be understood that the techniques described in the present application may be applied to any suitable type of optical modulator, for example, the push-pull optical modulator 250A depicted in FIG. 2A, the dual-drive optical modulator 250B depicted in FIG. 2B, or any other suitable optical modulator.

FIG. 3 generally illustrates a feedback signal 371 as a function of the bias ϕ. The feedback signal 371 may be analogous to the feedback signal 179 depicted in FIG. 1.

In particular, FIG. 3 depicts a plot of the real component of the feedback signal 371 (Re{x(ϕ)}, in arbitrary units AU) as a function of the bias ϕ (in radians). As will be understood from FIG. 3, a bias ϕ less than zero results in a feedback signal 371 that is less than zero, and a bias ϕ greater than zero results in a feedback signal 371 that is greater than zero. Accordingly, the feedback signal 371 is suitable for indicating the degree and direction of adjustment necessary for correction of the bias ϕ.

As noted above, the feedback signal 371 is suitable for bias control. However, as a practical matter, the feedback signal generated by the detector circuit 170 may be affect by a delay τ. The delay τ may arise as a result of processing and/or modulation delays of the dither signal 111 as it is transmitted through various components depicted in FIG. 1 (for example, the signal adder 120, the digital-to-analog converter 130, the optical modulator 150, and the photodetector 160). In particular, the delay τ may be equal to the difference between the time that the dither signal 111 is generated at the drive circuit 110 and the time that the dither signal 111 is recovered from the photocurrent 161.

FIG. 4 generally illustrates an array of potential feedback signals caused by a delay τ that is constant but unknown. Like the plot in FIG. 3, the plot in FIG. 4 depicts the real component of the feedback signal Re{x(ϕ)} (in arbitrary units AU) as a function of the bias ϕ (in radians). As will be understood from FIG. 4, the real component of the feedback signal Re{x(ϕ)} may vary as a function of the delay τ. In particular, the delay τ may cause the synchronous detector circuit 170 to calculate a feedback signal 179 having the form shown in Equation 4:

$$x(\phi,\tau)=A \sin 2\phi e^{-j\omega\tau}.\qquad\text{Eq. (4)}$$

A comparison of Equation 4 to Equation 3 reveals that an additional phase $e^{-j\omega\tau}$ appears. Because of the additional phase $e^{-j\omega\tau}$, the feedback signal x(ϕ,τ) has an imaginary component, such that Re{x(ϕ,τ)}≠x(ϕ,τ). It will be understood that the real component of the feedback signal Re{x(ϕ)} may vary due to the additional phase $e^{-j\omega\tau}$. For example, if there is a delay $\tau_0$=0, then the feedback signal may take the form of feedback signal 471-0. Moreover, if there is a delay $\tau_1$, then the feedback signal may take the form of feedback signal 471-1. Moreover, the feedback signals 471-2, 471-3, 471-4, 471-5, 471-6, and 471-7 shown in FIG. 4 may be caused by constant delays $\tau_2$, $\tau_3$, $\tau_4$, $\tau_5$, $\tau_6$, and $\tau_7$, respectively.

In synchronous systems, the delay τ may be predetermined and easily offset. For example, during a design and/or calibration phase, the value of the delay τ may be calculated and/or measured. As a result, the additional phase $e^{-j\omega\tau}$ caused by the delay τ may also be predetermined. Thus, in a synchronous system, the unknown delay τ may be calculated and/or measured, and then divided out of the feedback signal 179, such that the feedback signal 179 is purely a function of the bias ϕ.

However, consider a scenario in which the optical modulation system is not synchronized. For example, consider a scenario in which the original timing of the dither signal 111 is not communicated to the detector circuit 170. In this scenario, the effect of the delay τ on the phase of the photocurrent 161 cannot be offset using conventional techniques, even if the delay τ were to be calculated and/or measured in a design or calibration phase.

Asynchronous tone detection may be useful if tone generation and tone detection are performed independently, possibly by different devices that do not share a clock signal. For example, in some implementations, the tone generation may be performed digitally in an application specific integrated circuit (ASIC), and tone detection may be performed in a separate sub system (e.g., an optics box). Digital tone generation in accordance with such an arrangement may eliminate the need for any external tone generation circuitry without substantially increasing the cost of the ASIC.

As noted above, digital tone generation may provide benefits. However, high-speed data path filter characteristics may place a lower limit on the frequency of the dither signal. If the frequency of the dither signal rises, then synchronization becomes less effective and more demanding. Accordingly, optical modulation systems that use digital tone generation may benefit from effective methods of asynchronous tone detection.

Figure 5:
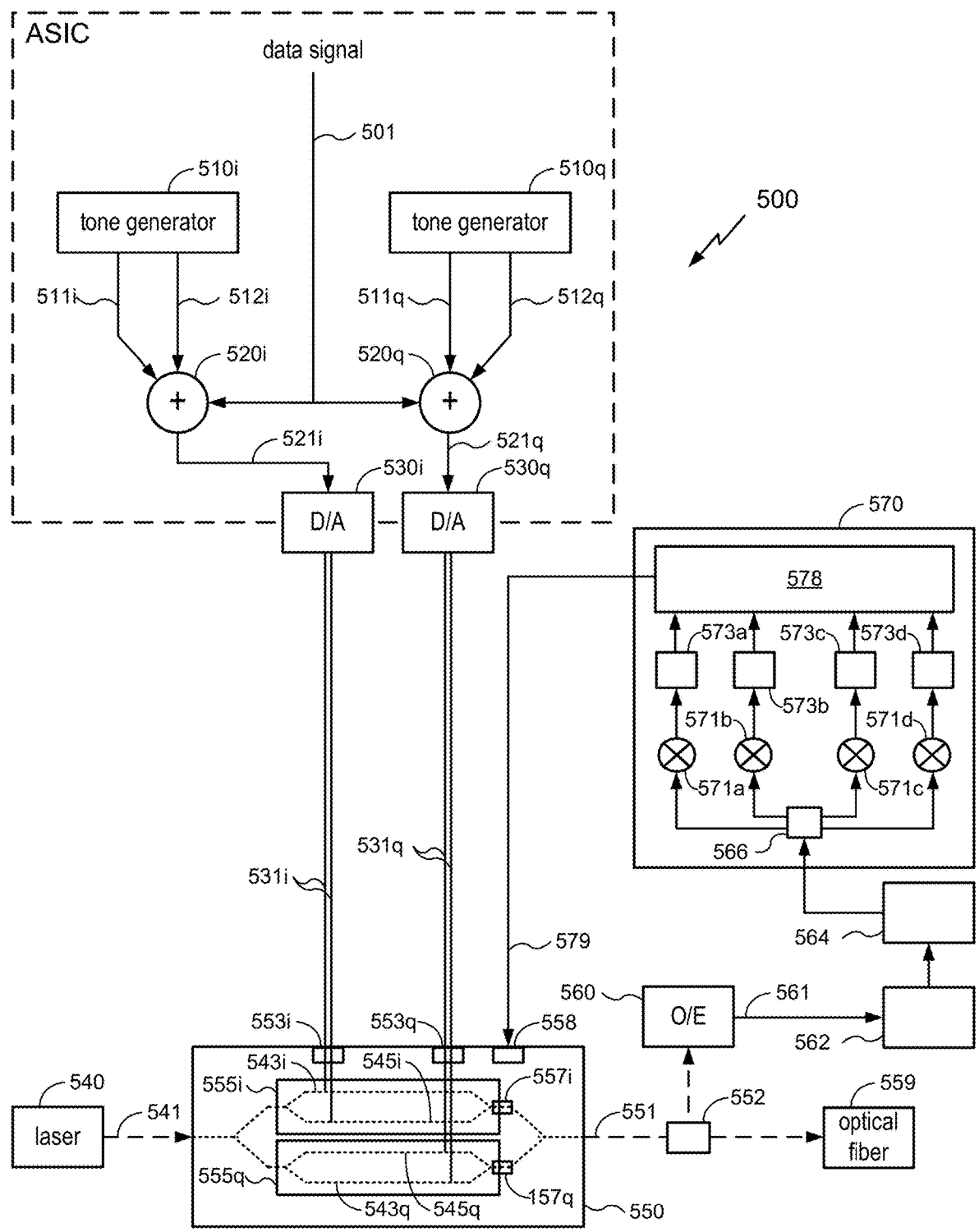
FIG. 5 generally illustrates a nested optical modulation system including two optical modulators and having asynchronous bias control in accordance with an aspect of the disclosure.

FIG. 5 generally illustrates a nested optical modulation system including two optical modulators and having asynchronous bias control in accordance with an aspect of the disclosure. The two optical modulators may be referred to as an in-phase (I) modulator and a quadrature (Q) modulator.

The optical modulation system 500 depicted in FIG. 5 may include a data signal 501 that is analogous to the data signal 101 depicted in FIG. 1.

The optical modulation system 500 may also include an in-phase drive circuit 510*i* and a quadrature drive circuit 510*q*. Unlike the drive circuit 110 depicted in FIG. 1, which generates a single dither signal 111, the in-phase drive circuit 510*i* and the quadrature drive circuit 510*q* each generate multiple dither signals. For example, the in-phase drive circuit 510*i* may generate a first in-phase dither signal 511*i* and a second in-phase dither signal 512*i*, whereas the quadrature drive circuit 510*q* may generate a first quadrature dither signal 511*q* and a second quadrature dither signal 512*q*.

The optical modulation system 500 may also include an in-phase signal adder 520*i* and a quadrature signal adder 520*q* that are analogous in some respects to the signal adder 120 depicted in FIG. 1. However, whereas the signal adder 120 depicted in FIG. 1 generates the sum signal 121 by adding a single dither signal 111 to the data signal 101, the in-phase signal adder 520*i* and the quadrature signal adder 520*q* that are depicted in FIG. 5 generate sum signals by adding multiple dither signals to the data signal 501. In particular, the in-phase signal adder 520*i* may generate an in-phase sum signal 521*i* and the quadrature signal adder 520*q* may generate a quadrature sum signal 521*q*. In some implementations, the in-phase sum signal 521*i* and the quadrature sum signal 521*q* may be converted to analog signals by an in-phase digital-to-analog converter 530*i* and a quadrature digital-to-analog converter 530*q*. The in-phase digital-to-analog converter 530*i* may generate one or more modulating signals 531*i* and the quadrature digital-to-analog converter 530*q* may generate one or more modulating signals 531*q*. The one or more modulating signals 531*i* and the one or more modulating signals 531*q* may be provided to an in-phase modulating signal electrode 553*i* and a quadrature modulating signal electrode 553*q*, respectively, associated with a modulation circuit 550, described in greater detail below.

It will be understood that instead of the in-phase sum signal 521*i* and the quadrature sum signal 521*q* described above, the in-phase signal adder 520*i* and the quadrature signal adder 520*q* may generate an in-phase differential modulating signal and a quadrature differential modulating signal. Accordingly, the one or more modulating signals 531*i* and one or more modulating signals 531*q* may include differential signals composed of a positive differential signal and an equal and opposite negative differential signal, as described above with respect to FIG. 2C.

The optical modulation system 500 may further include a laser 540 that generates an optical carrier signal 541. The optical carrier signal 541 may be, for example, continuous wave light. The optical carrier signal 541 may be provided to a modulation circuit 550. The modulation circuit 550 may include two nested optical modulators, for example, a first optical modulator and a second optical modulator. The first and second optical modulators may be an in-phase optical modulator 555*i* and a quadrature optical modulator 555*q*. The in-phase optical modulator 555*i* and the quadrature optical modulator 555*q* may be Mach-Zehnder modulators. The optical carrier signal 541 may be split into a first in-phase optical carrier signal 543*i*, a second in-phase optical carrier signal 545*i*, a first quadrature optical carrier signal 543*q*, and a second quadrature optical carrier signal 545*q*. The in-phase optical modulator 555*i* may include a connection 557*i* and the quadrature optical modulator 555*q* may include a connection 557*q*. The one or more in-phase modulating signal electrodes 153*i* may be further configured to route the one or more in-phase modulating signals 131*i* to the first in-phase optical carrier signal 143*i* and the second in-phase optical carrier signal 145*i*. The one or more quadrature modulating signal electrodes 153*q* may be further configured to route the one or more quadrature modulating signals 131*q* to the first quadrature optical carrier signal 143*q* and the second quadrature optical carrier signal 145*q*.

The modulated optical signal 551 may be an output of the optical modulation system 500 and may be provided to an element of an external optical communications system, for example, an optical fiber 559. Like the optical modulator 150, the modulation circuit 550 may be biased at a null transmission point. Any deviation from the null transmission point may lead to degradation of the modulated optical signal 551. For example, the transmission point of the modulation circuit 550 may shift due to aging of the modulation circuit 550 or environmental factors (for example, excess heat). However, as will be discussed in greater detail below, the optical modulation system 500 may control bias so as to prevent degradation of the modulated optical signal 551.

To facilitate bias control in the optical modulation system 500, a portion of the modulated optical signal 551 may be tapped and provided to a photodetector 560. Accordingly, the optical modulation system 500 may further include, for example, an optical splitter or beam splitter 552. The photodetector 560 may then generate a photocurrent 561 based on the modulated optical signal 551. The photodetector 560 may generate the photocurrent 561 by converting the modulated optical signal 551 into an electrical signal representative of the modulated optical signal 551. Also depicted in FIG. 5 are a filter 562 for filtering the photocurrent 561 and an analog-to-digital converter 564 for converting the photocurrent 561 to a digital signal.

The optical modulation system 500 may further include a detector circuit 570. Like the synchronous detector circuit 170 depicted in FIG. 1, which generates feedback signal 179 that is provided to the feedback signal electrode 158 of the optical modulator 150, the detector circuit 570 generates a feedback signal 579 that is provided to feedback signal electrodes 558 of the modulation circuit 550. For example, the modulation circuit 550 may use the feedback signal 579 to adjust a bias φ of the modulation circuit 550, such that the feedback signal x tends toward zero. For simplicity, the feedback signal 579 is shown as a single arrow. However, it will be understood that feedback signal electrodes 558 may include a plurality of feedback signal electrodes, for example, one or more in-phase feedback signal electrodes and one or more quadrature feedback signal electrodes and the feedback signal 579 may include an in-phase feedback signal and a separate quadrature feedback signal. Moreover, as discussed previously with respect to FIG. 2C, the feedback signal 579 may include one or more differential signals.

In order to generate the feedback signal 579, the detector circuit 570 may include a splitter 566 that splits the photocurrent 561 and feeds the photocurrent 561 to a plurality of multipliers, including a first multiplier 571*a*, a second multiplier 571*b*, a third multiplier 571*c*, and a fourth multiplier 571*d*. The operations of the plurality of multipliers will be described in greater detail below. The respective outputs of the plurality of multipliers may be supplied to a plurality of integrators, including a first integrator 573*a*, a second integrator 573*b*, a third integrator 573*c*, and a fourth integrator 573*d*. The operations of the plurality of integrators will be described in greater detail below. The respective outputs of the plurality of integrators may be supplied to a feedback processor 578, which may generate the feedback signal 579. The operations of the feedback processor 578 will be described in greater detail below. As will be understood from FIG. 5, the in-phase drive circuit 510*i* and a quadrature drive circuit 510*q* do not provide dither signals to the detector circuit 570. Accordingly, the detector circuit 570 cannot determine the feedback signal 579 based on a simple comparison between a dither signal analogous to the dither signal 111 and a recovered version thereof. Instead, as will be described in greater detail below, the detector circuit 570 generates the feedback signal 579 using other techniques.

Figure 6:
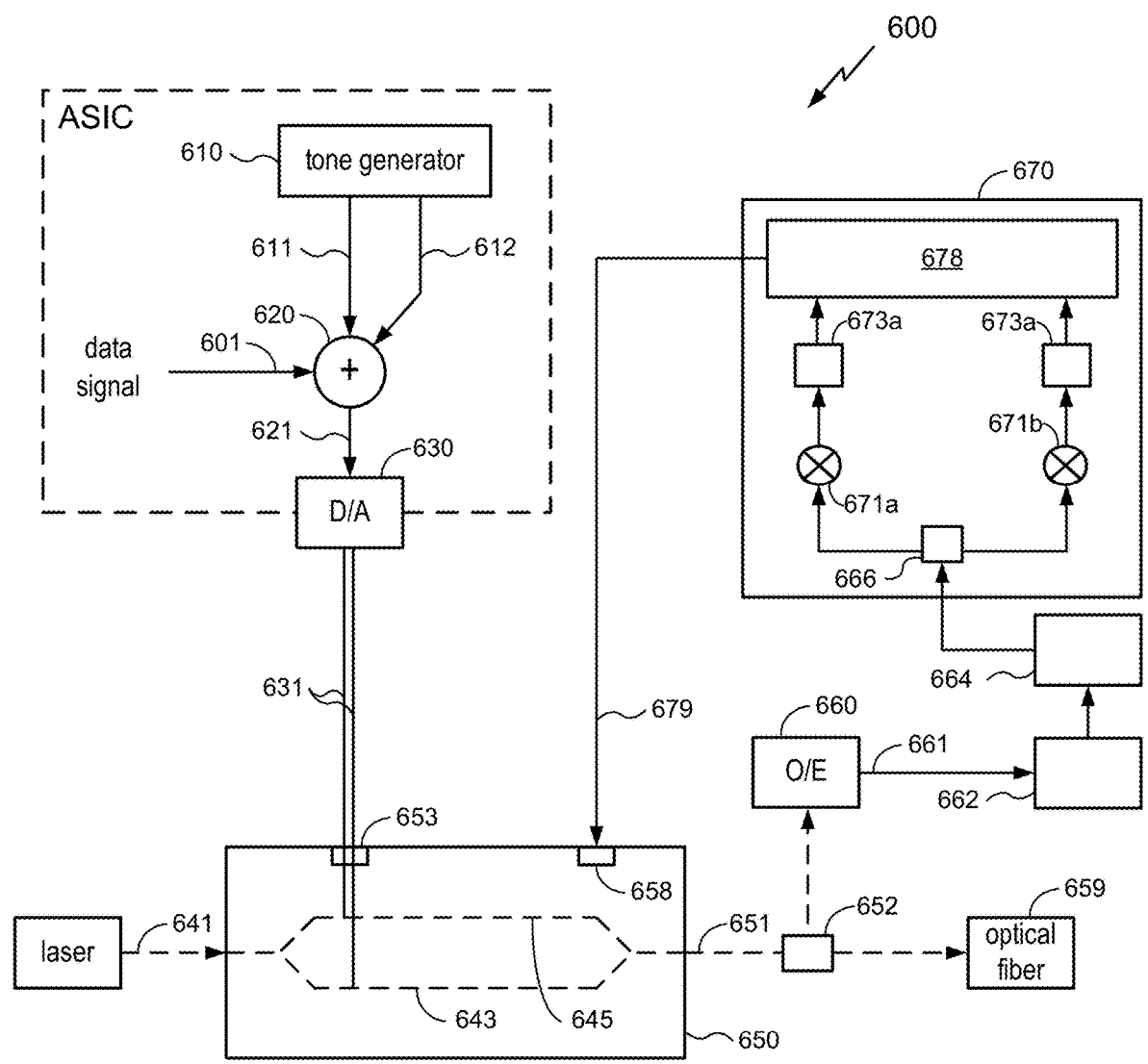
FIG. 6 generally illustrates an optical modulation system including a single optical modulator and having asynchronous bias control in accordance with an aspect of the disclosure.

FIG. 6 generally illustrates an optical modulation system 600 in accordance with an aspect of the disclosure. Unlike FIG. 5, which depicts a nested modulation circuit 550 that includes the in-phase optical modulator 555*i* and the quadrature optical modulator 555*q*, FIG. 6 depicts a single modulation circuit 650, as will be described in greater detail below.

The optical modulation system 600 depicted in FIG. 6 may include a data signal 601 that is analogous to the data signal 101 depicted in FIG. 1.

The optical modulation system 600 may also include a drive circuit 610. Unlike the drive circuit 110 depicted in FIG. 1, which generates a single dither signal 111, the drive circuit 610 generates multiple dither signals. As will be discussed in greater detail below, the first dither signal 611 may have a first frequency $\omega_1$ and the second dither signal 612 may have a second frequency $\omega_2$. In some implementations, the first dither signal 611 may be referred to as a 'primary' dither signal and the secondary dither signal 612 may be referred to as a 'trigger' dither signal.

The optical modulation system 600 may also include a signal adder 620 that is analogous in some respects to the signal adder 120 depicted in FIG. 1. However, whereas the signal adder 120 depicted in FIG. 1 generates the sum signal 121 by adding a single dither signal 111 to the data signal 101, the signal adder 620 depicted in FIG. 6 generates a sum signal 621 by adding both the first dither signal 611 and the secondary dither signal 612 to the data signal 601.

In the implementation shown in FIG. 6, the data signal 601 may be a digital data signal that is generated and/or processed within an ASIC. Additionally or alternatively, the drive circuit 610 may be implemented on the ASIC and may generate digital dither signals. Additionally or alternatively, the signal adder 620 may be implemented on the ASIC and the sum signal 621 may be a digital sum signal. In the implementation shown in FIG. 6, the sum signal 621 is converted to one or more modulating signals 631 by a digital-to-analog converter 630. It will be understood that instead of the sum signal 621 described above, the signal adder 620 may generate differential modulating signals. Accordingly, the one or more modulating signals 631 may include a positive differential signal and an equal and opposite negative differential signal, as described above with respect to FIG. 2C. The one or more modulating signals 631 may be provided to a modulating signal electrode 653 associated with a modulation circuit 650, described in greater detail below.

Although the implementation shown in FIG. 6 shows the drive circuit 610 and signal adder 620 implemented on an ASIC in the digital domain, it will be understood that in accordance with other aspects of the disclosure, the drive circuit 610 and/or the signal adder 620 may be implemented in the analog domain.

The optical modulation system 600 may further include a laser 640 that generates an optical carrier signal 641. The optical carrier signal 641 may be, for example, continuous wave light. The optical carrier signal 641 may be provided to a modulation circuit 650. The modulation circuit 650 may be an optical modulator, for example, a Mach-Zehnder modulator. The optical carrier signal 641 may be split into a first optical carrier signal 643, and a second optical carrier signal 645. The one or more modulating signal electrodes 653 may be further configured to route the one or more modulating signals 631 to the first optical carrier signal 643, and a second optical carrier signal 645. The modulation circuit 650 may modulate the optical carrier signal 641 based on the one or more modulating signals 631 to generate a modulated optical signal 651. The modulated optical signal 651 may be an output of the optical modulation system 600 and may be provided to an element of an external optical communications system, for example, an optical fiber. The modulated optical signal 651 may carry first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer. Like the optical modulator 150, the modulation circuit 650 may be biased at a null transmission point. Any deviation from the null transmission point may lead to degradation of the modulated optical signal 651. For example, the transmission point of the modulation circuit 650 may shift due to aging of the modulation circuit 650 or environmental factors (for example, excess heat). However, as will be discussed in greater detail below, the optical modulation system 600 may control bias so as to prevent degradation of the modulated optical signal 651.

To facilitate bias control in the optical modulation system 600, a portion of the modulated optical signal 651 may be tapped and provided to a photodetector 660. Accordingly, the optical modulation system 600 may further include, for example, an optical splitter or beam splitter 652. The photodetector 660 may detect a portion of the modulated optical signal 651. The photodetector 660 may then generate a photocurrent 661 based on the modulated optical signal 651. The photodetector 660 may generate the photocurrent 661 by converting the modulated optical signal 651 into an electrical signal representative of the modulated optical signal 651. Also depicted in FIG. 6 are a filter 662 for filtering the photocurrent 661 and an analog-to-digital converter 664 for converting the photocurrent 661 to a digital signal.

The optical modulation system 600 may further include a detector circuit 670. The detector circuit 670 may be an asynchronous detector circuit. Like the synchronous detector circuit 170 depicted in FIG. 1, which generates a feedback signal 179 that is provided to the feedback signal electrode 158 of the optical modulator 150, the detector circuit 670 generates a feedback signal 679 that is supplied to a feedback signal electrode 658 of the modulation circuit 650. For example, the modulation circuit 650 may use the feedback signal 679 to adjust a bias ϕ of the modulation circuit 650, such that the feedback signal x tends toward zero. For simplicity, the feedback signal 679 is shown as a single arrow. However, it will be understood that feedback signal electrodes 658 may include a plurality of feedback signal electrodes, feedback signal electrodes associated with positive and negative differential signals, as discussed previously with respect to FIG. 2C.

In order to generate the feedback signal 679, the detector circuit 670 may include a splitter 666 that splits the photocurrent 661 and feeds the photocurrent 661 to a plurality of multipliers, including a first multiplier 679a and a second multiplier 679b. The operations of the plurality of multipliers will be described in greater detail below. The respective outputs of the plurality of multipliers may be supplied to a plurality of integrators, including a first integrator 673a and a second integrator 673b. The operations of the plurality of integrators will be described in greater detail below. The respective outputs of the plurality of integrators may be supplied to a feedback processor 678, which may generate the feedback signal 679. The operations of the feedback processor 678 will be described in greater detail below. As will be understood from FIG. 6, the drive circuit 610 does not provide dither signals to the detector circuit 670. Accordingly, the detector circuit 670 cannot determine the feedback signal 679 based on a simple comparison between a dither signal analogous to the dither signal 111 and a recovered version thereof. Instead, as will be described in greater detail below, the detector circuit 670 generates the feedback signal 679 using other techniques.

As will be understood from FIG. 6, the drive circuit 610 does not provide either of the first dither signal 611 or the second dither signal 612 to the detector circuit 670. Accordingly, the detector circuit 670 cannot determine the feedback signal 679 based on a simple comparison between a dither signal analogous to the dither signal 111 and a recovered version thereof. Instead, as will be described in greater detail below, the detector circuit 670 generates the feedback signal 679 using other techniques.

Figures 7, 8:
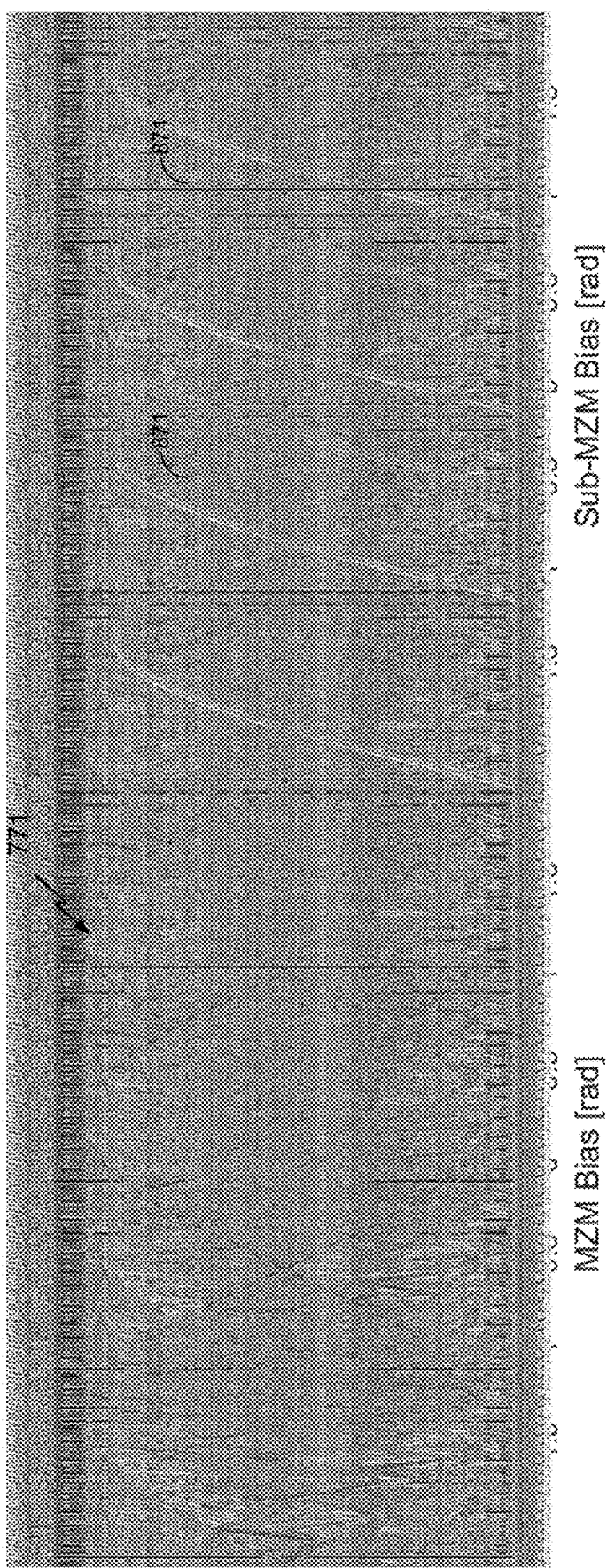
FIG. 7 generally illustrates an array of potential feedback signals caused by a delay τ that is random and unknown.
FIG. 8 generally illustrates a magnitude component of a feedback signal that is affected by a random, unknown delay τ.

FIG. 7 generally illustrates an array of potential feedback signals caused by a random delay $\tau$. Like the plots in FIGS. 3-4, the plot in FIG. 7 depicts a plurality of feedback signals 771 (in arbitrary units AU) as a function of the bias $\phi$ (in radians).

In an asynchronous optical modulation system (like the optical modulation system 600 depicted in FIG. 6), the delay $\tau$ may be a random and unknown value. As a result, the delay $\tau$ may affect the feedback signal in an unpredictable manner. For example, in an asynchronous optical modulation system affected by a random, unknown delay $\tau$, the detector circuit may generate a feedback signal similar to the feedback signal 771 depicted in FIG. 7. It will be understood from FIG. 7 that if a suitable feedback signal is to be generated in the asynchronous optical modulation system 600, the effects of the delay $\tau$ must somehow be eradicated.

FIG. 8 generally illustrates a magnitude component of a feedback signal that is affected by a random, unknown delay $\tau$. Recall from Equation 4 that the feedback signal x, if affected by a delay $\tau$, may take the following form:

$$x(\phi,\tau)=A \sin 2\phi e^{-j\omega\tau}.\qquad\text{Eq. (4)}$$

Because of the additional phase $e^{-j\omega\tau}$, caused by a random, unknown delay $\tau$, the feedback signal has an imaginary component, such that $\text{Re}\{x(\phi,\tau)\} \ne x(\phi,\tau)$. However, feedback signal $x(\phi,\tau)$ may be made independent of the delay $\tau$ by determining a magnitude of the feedback signal $|x(\phi,\tau)|$. The feedback signal magnitude component $|x(\phi,\tau)|$ is depicted in FIG. 8 as the feedback signal magnitude 871. As will be understood from FIG. 8, $|x(\phi,\tau)|=|x(\phi)|$.

Although the magnitude determination succeeds in eradicating the effects of the unknown delay $\tau$, it will be understood from FIG. 8 that the magnitude determination also eliminates the sign (positive or negative) of the feedback signal $x(\phi,\tau)$. Because the feedback signal magnitude 871 does not communicate the sign of the feedback signal $x(\phi,\tau)$, the feedback signal magnitude 871 is not, by itself, suitable for usage as the feedback signal 679 in the asynchronous optical modulation system 600 depicted in FIG. 6.

For example, as can be appreciated by a comparison of the feedback signal magnitude 871 to the feedback signal 371 of FIG. 3, a positive bias $\phi$ may result in a positive feedback signal magnitude 871, but a negative bias $\phi$ may also result in a positive feedback signal magnitude 871. Therefore, as noted above, the feedback signal magnitude 871 is not, by itself, suitable for usage as the feedback signal 679 in the asynchronous optical modulation system 600 depicted in FIG. 6.

Accordingly, if the feedback signal magnitude 871 is to be of any use for generating the feedback signal 679, then the detector circuit 670 must also determine a feedback signal sign component $\text{sgn}(x(\phi))$. In accordance with an aspect of the disclosure, the feedback signal sign component $\text{sgn}(x(\phi))$ can be determined if two dither signals having particular signal characteristics (for example, the first dither signal 611 and the second dither signal 612) are added to the data signal 601.

Figure 9:
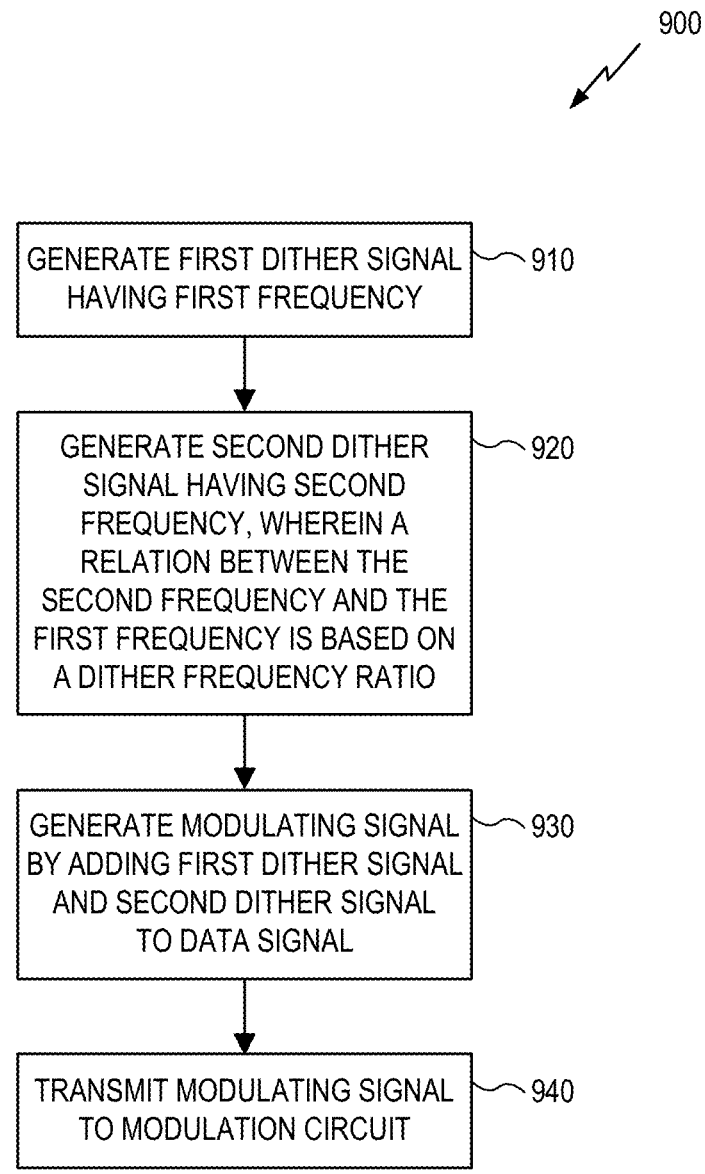
FIG. 9 generally illustrates a method for generating a plurality of dither signals in an asynchronous optical modulation system.

FIG. 9 generally illustrates a method 900 for generating a plurality of dither signals. In some implementations, the plurality of dither signals may enable an asynchronous optical modulation system such as the optical modulation system 500 or the optical modulation system 600 to perform bias control of a bias $\phi$.

The method 900 will be described below as it would be performed by one or more specific components of the optical modulation system 600 depicted in FIG. 6. However, it will be understood that the method 900 may also be performed by one or more specific components of the optical modulation system 500 depicted in FIG. 5. For example, the method 900 may facilitate bias control in the in-phase optical modulator 555i, the quadrature optical modulator 555q, or any combination thereof.

In particular, the method 900 will be described below as it would be performed by the ASIC depicted in FIG. 6, upon which the drive circuit 610, the signal adder 620, and the digital-to-analog converter 630 are implemented. However, it will be understood that the method 900 may be performed by any suitable element or elements in the analog and/or the digital domain.

At 910, the method 900 generates a first dither signal 611 having a first frequency. The first dither signal may have a first frequency $\omega_1$. The first dither signal 611 generated at 910 may be a function of time t and may be denoted $d_1(t)$. In some implementations, the first dither signal 611 may take the form of a wave having amplitude $A_1$, as shown in Equation 5:

$$d_1(t)=A_1\cos(\omega_1 t)\qquad\text{Eq. (5)}$$

In some implementations, the first dither signal 611 may consist entirely of a sinusoidal wave having components at a single frequency equal to the first frequency $\omega_1$.

At 920, the method 900 generates a second dither signal 612 having a second frequency $\omega_2$, wherein a relation between the second frequency $\omega_2$ and the first frequency $\omega_1$ is based on a dither frequency ratio. The second dither signal 612 generated at 920 may be a function of time t and may be denoted $d_2(t)$. In some implementations, the second dither signal 612 may take the form of a sinusoidal wave having amplitude $A_2$, as shown in Equation 6:

$$d_2(t)=A_2\cos(\omega_2 t)\qquad\text{Eq. (6)}$$

In some implementations, the second dither signal 612 may consist entirely of a sinusoidal wave having components at a single frequency equal to the second frequency $\omega_2$.

The dither frequency ratio may be a ratio of the first frequency $\omega_1$ to the second frequency $\omega_2$. In some implementations, the dither frequency ratio may be equal to m/n, and the second frequency $\omega_2$ may be selected such that $\omega_t = m/n * \omega_1$. Moreover, m and n may be selected such that m and n are both integers, such that m/n is a rational number. Moreover, m and n may be selected such that m is an odd integer and n is an even integer.

At 930, the method 900 generates one or more modulating signals 631 by adding the first dither signal 611 and the second dither signal 612 to a data signal 601.

At 940, the method 900 transmits the one or more modulating signals 631 to a modulation circuit. The modulation circuit may be analogous to, for example, the modulation circuit 650 depicted in FIG. 6.

Figure 10:
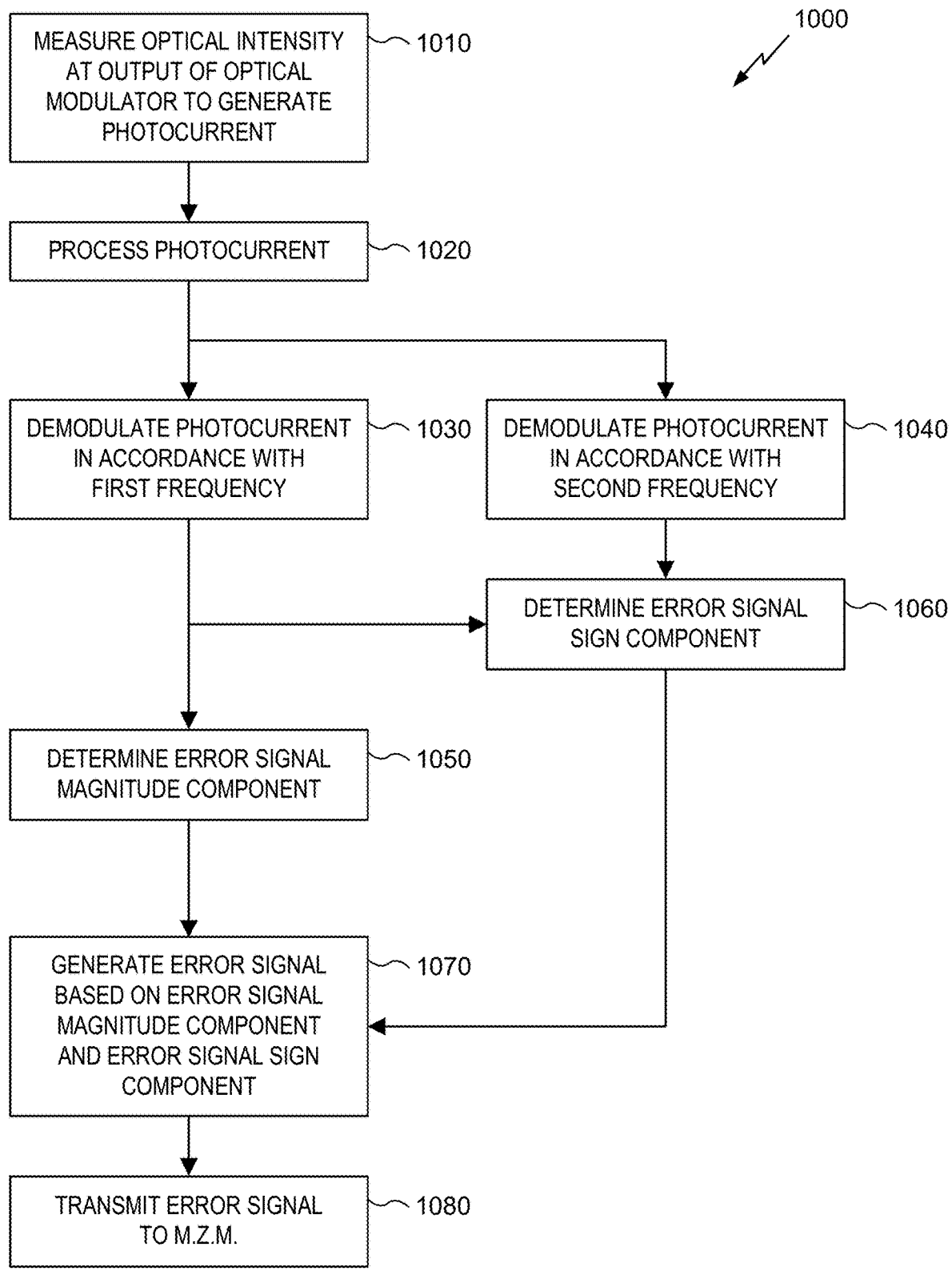
FIG. 10 generally illustrates a method for generating a feedback signal in an asynchronous optical modulation system.

FIG. 10 generally illustrates a method 1000 for generating a feedback signal x(ϕ) in an asynchronous optical modulation system. The feedback signal x(ϕ) may be independent of any delay τ caused by the optical modulation system.

The method 1000 will be described below as it would be performed by one or more specific components of the optical modulation system 600 depicted in FIG. 6. However, it will be understood that the method 1000 may also be performed by one or more specific components of the optical modulation system 500 depicted in FIG. 5. For example, the method 1000 may facilitate bias control in the in-phase optical modulator 555*i*, the quadrature optical modulator 555*q*, or any combination thereof.

In particular, the method 900 will be described below as it would be performed by the photodetector 660 and the detector circuit 670 depicted in FIG. 6. However, it will be understood that the method 1000 may be performed by any suitable element or elements in the analog and/or the digital domain.

At 1010, the method 1000 measures an optical intensity at an output of the modulation circuit 650 to generate a photocurrent 661. The measuring at 1010 may be performed by, for example, the photodetector 660 depicted in FIG. 6.

At 1020, the method 1000 processes the photocurrent 661 measured at 1010. The processing may include, for example, analog-to-digital conversion of the photocurrent 661. In some implementations, the detector circuit 670 may be implemented in the digital domain. Accordingly, the detector circuit 670 may include an analog-to-digital converter (not shown).

The processing at 1020 may further include, for example, filtering of the photocurrent 661. The filtering may include removal of a high-frequency band, as would be performed by a low-pass filter. In some implementations, the photocurrent 661 may be filtered to facilitate recovery of the first dither signal 611 and/or the second dither signal 612. For example, frequencies that are at or near the first frequency $\omega_1$ and/or the second frequency $\omega_2$ may be passed by the filter. In some implementations, the filtering may be performed before or after other forms of processing, for example, analog-to-digital conversion. For example, the photocurrent 661 may be filtered using analog components. Alternatively, the photocurrent 661 may be converted to a digital signal and the detector circuit 670 may perform digital filtering on the photocurrent 661.

The processing at 1020 may further include, for example, splitting and/or amplification of the photocurrent 661.

At 1030, the method 1000 correlates the photocurrent 661 in accordance with the first frequency. The first frequency used to correlate the photocurrent 661 may be equal to the first frequency $\omega_1$ described above in relation to FIG. 9. The result of the demodulating at 1030 may be referred to as a first correlation result.

At 1040, the method 1000 correlates the photocurrent 661 in accordance with a second frequency. The second frequency used to correlate the photocurrent 661 may be equal to the second frequency $\omega_2$ described above in relation to FIG. 9. The result of the correlating at 1040 may be referred to as a second correlation result.

In some implementations, the first frequency $\omega_1$ used to obtain the first correlation result and the second frequency $\omega_2$ used to obtain the second correlation result may be predetermined, for example, selected at a design or calibration stage. As noted above in the description of FIG. 9, the respective values of the first frequency $\omega_1$ and the second frequency $\omega_2$ may be selected based on a dither frequency ratio, for example, m/n. In some implementations, the predetermined values of the first frequency $\omega_1$ and the second frequency $\omega_2$ may be used by the drive circuit 610 to generate the first dither signal 611 and the second dither signal 612, as discussed above in relation to FIG. 9.

As noted above, the processing at 1020 may include splitting and/or amplification of the photocurrent 661. In some implementations, the photocurrent 661 may be split into two signals and the respective split photocurrents may be separately correlated at 1030 and 1040.

The correlating at 1030 and the correlating at 1040 may be performed in the analog domain using, for example, one or more analog waveform generators, one or more analog mixers, and one or more analog integrators or low-pass filtering components, or in the digital domain using, for example, an ASIC or field-programmable gate array.

The correlating at 1030 and the correlating at 1040 may be performed, in the digital or analog domain, by multiplying the photocurrent 661 by $e^{j\omega t}$ and integrating the result over a correlation period. It will be understood that for the correlating at 1030, $\omega$ will be the first frequency $\omega_1$ and for the correlating at 1040, $\omega$ will be the second frequency $\omega_2$.

For example, the correlating at 1030 may include multiplying the photocurrent 661 by $\cos(\omega_1 t)$. The multiplying may be performed by, for example, the first multiplier 671*a*. The correlating may further include integrating over a correlation period to obtain a first integration result. The integrating may be performed by, for example, the first integrator 673*a*. The correlating may further include multiplying the photocurrent 661 by $\sin(\omega_1 t)$ and then integrating over the correlation period to obtain a second integration result, performed by the first multiplier 671*a* and the first integrator 673*a*, respectively. The correlating may further include summing the first integration result with the product of the imaginary number j and the second integration result to obtain the first complex result.

Moreover, the correlating at 1040 may include multiplying the photocurrent 661 by $\cos(\omega_2 t)$. The multiplying may be performed by, for example, the second multiplier 671*b*. The correlating may further include integrating over a correlation period to obtain a first integration result. The integrating may be performed by, for example, the second integrator 673*b*. The correlating may further include multiplying the photocurrent 661 by $\sin(\omega_2 t)$ and then integrating over the correlation period to obtain a second integration result, performed by the second multiplier 671*b* and the second integrator 673*b*, respectively. The correlating may further include summing the first integration result with the product of the imaginary number j and the second integration result to obtain the first complex result.

Before proceeding with the description of the method 1000, recall that the purpose of the method 1000 is to generate a feedback signal x(φ) for bias control in an asynchronous optical modulation system. As noted above, the feedback signal x(φ) may preferably take the form shown in Equation 4. The difficulty is that a delay τ may be caused by various components in the optical modulation system 600, such that the feedback signal x(φ) becomes a function of both φ and r (i.e., x(φ,τ)).

In the synchronous optical modulation system 100, the delay τ can be readily determined and its effects eradicated, as noted above. However, in an asynchronous system, the delay τ cannot be readily determined.

In an asynchronous system, a feedback signal that is affected by the delay τ can be made independent of the delay τ by determining a feedback signal magnitude component |x(φ)|. However, as shown in FIG. 8, the feedback signal magnitude component |x(φ)|, taken by itself, is an unsuitable feedback signal because a positive bias φ and a negative bias φ may result in the same feedback signal value. In other words, the degree of the adjustment may be communicated to the modulation circuit 650, but the direction of the adjustment may not be communicated to the modulation circuit 650.

As will be discussed in greater detail below, if a feedback signal sign component sgn(x(φ)) can be determined, then a suitable feedback signal having form x(φ) can be reconstructed as the product of the feedback signal magnitude component |x(φ)| and the feedback signal sign component sgn(x(φ)). In other words, the degree and direction of the adjustment may be determined independently and combined so as to generate a suitable feedback signal x(φ).

At this point, we consider the signum function, defined in terms of an arbitrary variable z, as shown in Equation 7:

$$\text{sgn}(z)=z/|z| \qquad \text{Eq. (7)}$$

It will be understood that for all positive and real values of z, sgn(z) is equal to +1, and that for all negative and real values of z, sgn(z) is equal to −1.

Similarly, if feedback signal x(φ) is a real function, a feedback signal sign component sgn(x(φ)) may be represented as x(φ)/|x(φ)|, wherein sgn(x(φ))=±1. However, if the feedback signal x(φ) is complex, then the feedback signal sign component sgn(x(φ)) may further include an exponential, including the phase.

Accordingly, a reconstructed feedback signal x(φ) may be expressed as a product of the feedback signal magnitude component |x(φ)| and the feedback signal sign component sgn(x(φ)), such that x(φ)=|x(φ)|*sgn(x(φ)). With this in mind, we proceed with the description of the method 1000.

At 1050, the method 1000 determines a feedback signal magnitude component |x(φ)|. The determining at 1050 may be based on the first correlation result obtained from the correlating at 1030 (for example, a component of the photocurrent 661 associated with the first frequency $\omega_1$) and/or the second correlation result obtained from the correlating at 1040 (for example, a component of the photocurrent 661 associated with the second frequency $\omega_2$). It will be understood that the feedback signal magnitude component |x(φ)| may be determined based on the second correlation result alone, or on some combination of the first correlation result and the second correlation result. For example, a sum or average of the first correlation result and the second correlation result may be used to determine the feedback signal magnitude component |x(φ)|, which may achieve increased noise rejection. However, in the example that follows, the determining at 1050 may be solely based on the first correlation result.

As noted in the description of FIG. 9, the first dither signal 611 may have the form shown in Equation 5. Accordingly, it will be understood that the first correlation result obtained at 1030 may be expressed as a complex value. The complex value may be denoted $x_1$, and may be a function of a bias phase φ and a random, unknown delay τ caused by transmission of the first dither signal 611 through various components of the optical modulation system 600 depicted in FIG. 6. The complex value $x_1(\phi,\tau)$ may take the form shown in Equation 8:

$$x_1(\phi,\tau)=A_1 \sin 2\phi e^{-j\omega_1\tau}. \qquad \text{Eq. (8)}$$

As noted above, the effects of the delay τ may be eradicated by determining a magnitude of the complex value |$x_1(\phi,\tau)$|. Accordingly, the determining at 1050 of the feedback signal magnitude component |x(φ)| may be performed as shown in Equation 9:

$$|x(\phi)|=|x_1(\phi,\tau)|=|A_1 \sin 2\phi|. \qquad \text{Eq. (9)}$$

At 1060, the method 1000 determines a feedback signal sign component sgn(x(φ)). The determining at 1060 may be based on the first correlation result, the second correlation result, and the dither frequency ratio m/n, described above in relation to FIG. 9. As noted above, the dither frequency ratio m/n may define a relation between the second frequency $\omega_2$ and the first frequency $\omega_1$. Accordingly, a tone detection circuit that is configured to correlate the photocurrent 661 based on the first frequency $\omega_1$ and the second frequency $\omega_2$ may have implicit knowledge of the dither frequency ratio m/n.

As noted above, the first correlation result obtained at 1030 may be the complex value $x_1(\phi,\tau)$. It will be understood that the second correlation result obtained at 1040 may also be expressed as a complex value. In particular, the second correlation result may be denoted $x_2$, and may be a function of a bias phase φ and a random, unknown delay τ caused by transmission of the second dither signal 612 through various components of the optical modulation system 600 depicted in FIG. 6. The complex value $x_2(\phi,\tau)$ may take the form shown in Equation 10:

$$x_2(\phi,\tau)=A_2 \sin 2\phi e^{-j\omega_2\tau}. \qquad \text{Eq. (10)}$$

It will be understood that because the first dither signal 611 and the second dither signal 612 are transmitted simultaneously, the delay τ experienced by the second dither signal 612 as it is transmitted through the optical modulation system 600 will be equal to the delay τ experienced by the first dither signal 611 as it is transmitted through the optical modulation system 600.

As will be discussed in greater detail below, it can be shown that the feedback signal sign component sgn(x(φ)) can be determined based on the complex value $x_1(\phi,\tau)$, the complex value $x_2(\phi,\tau)$, and the components of the dither frequency ratio m/n. The numerator m of the dither frequency ratio and the denominator n of the dither frequency ratio may be, for example, derived from the values of $\omega_1$ and $\omega_2$. In particular, the feedback signal sign component sgn(x(φ)) may be determined in accordance with Equation 11, wherein a first signum result of the first correlation result is raised to a first power, a second signum result of the second correlation result is raised to a second power, and a signum ratio of the first signum result and the second signum result is determined:

$$\text{sgn}(x(\phi)) = \frac{\text{sgn}(x_1(\phi, \tau))^m}{\text{sgn}(x_2(\phi, \tau))^n}. \quad \text{Eq. (11)}$$

It will be understood from Equation 11 that the first power and the second power may be set to m and n, respectively. As will be understood from Equation 11, the first signum result may be divided by the second signum result to determine the signum ratio. However, the result may be the same if the signum ratio is determined by dividing the second signum result by the first signum result. Accordingly, the feedback signal sign component may be determined based on the signum ratio of the first signum result and the second signum result, regardless of which signum result is in the numerator and which is in the denominator.

As proof that the feedback signal sign component sgn(x(ϕ)) may be obtained in this manner, consider that the expression on the right-hand side of Equation 11 may be re-expressed as shown below in Equation 12:

$$\frac{\text{sgn}(x_1(\phi, \tau))^m}{\text{sgn}(x_2(\phi, \tau))^n} = \frac{[\text{sgn}(A_1\sin 2\phi)e^{-j\omega_1\tau}]^m}{[\text{sgn}(A_2\sin 2\phi)e^{-j\omega_2\tau}]^n}. \quad \text{Eq. (12)}$$

As will be understood from Equation 12, the signum function may be applied to the first correlation result (in the numerator) and the second correlation result (in the denominator). In the numerator, application of the signum function may result in isolation of a first exponential $e^{-j\omega_1\tau}$ from a first remainder, and in the denominator, application of the signum function may result in isolation of the second exponential $e^{-j\omega_2\tau}$ from a second remainder. As will be further understood from Equation 12, the first exponential may be raised to a first power (equal to the numerator m of the dither frequency ratio m/n) and the second exponential may be raised to a second power (equal to the denominator n of the dither frequency ratio m/n). To further simplify, the expression on the right-hand side of Equation 12 may be re-expressed as shown below in Equation 13:

$$\frac{[\text{sgn}(A_1\sin 2\phi)e^{-j\omega_1\tau}]^m}{[\text{sgn}(A_2\sin 2\phi)e^{-j\omega_2\tau}]^n} = e^{-j\tau(m\omega_1 - n\omega_2)}\frac{\text{sgn}(A_1\sin 2\phi)^m}{\text{sgn}(A_2\sin 2\phi)^n}. \quad \text{Eq. (13)}$$

Recall that the dither frequency ratio m/n may be defined in terms of the first frequency $\omega_1$ and the second frequency $\omega_2$, such that $\omega_2 = m/n * \omega_1$. Accordingly, the term $(m\omega_1 - n\omega_2)$ may equal zero, such that the complex value $e^{-j\tau(m\omega_1-n\omega_2)}$ may be dropped. Therefore, Equation 13 may be further simplified as shown in Equation 14:

$$e^{-j\tau(m\omega_1 - n\omega_2)}\frac{\text{sgn}(A_1\sin 2\phi)^m}{\text{sgn}(A_2\sin 2\phi)^n} = \frac{\text{sgn}(A_1\sin 2\phi)^m}{\text{sgn}(A_2\sin 2\phi)^n}. \quad \text{Eq. (14)}$$

It may now be observed that the expression is independent of the delay τ. Accordingly, it will be understood that the feedback signal sign component sgn(x(ϕ)) may be determined independently of the delay τ. Moreover, all remaining signum function arguments are real, thereby omitting potential noise terms. As will be understood from Equation 14, the first remainder may be raised to the first power (m, as noted above) and the second remainder may be raised to the second power (n, as noted above). As will be shown below, the feedback signal sign component sgn(x(ϕ)) may be determined by dividing the raised first remainder by the raised second remainder.

Consider a scenario where n is selected as an even integer. Because the denominator on the right-hand side of Equation 14 is raised to the power of n (with n being an even integer), it will be understood that the denominator may equal +1. Accordingly, Equation 14 may be further simplified as shown in Equation 15:

$$\frac{\text{sgn}(A_1\sin 2\phi)^m}{\text{sgn}(A_2\sin 2\phi)^n} = \text{sgn}(A_1\sin 2\phi)^m. \quad \text{Eq. (15)}$$

Next, consider a scenario where m is selected as an odd integer. Because the expression on the right-hand side of Equation 15 is raised to the power of m (with m being an odd integer), it will be understood that the sign of the expression will not change based on the value of m. Accordingly, Equation 15 may be further simplified as shown in Equation 16:

$$\text{sgn}(A_1\sin 2\phi)^m = \text{sgn}(A_1\sin 2\phi). \quad \text{Eq. (16)}$$

A comparison of Equation 16 to Equation 4 shows that the feedback signal sign component sgn(x(ϕ)) may be resolved in an asynchronous optical modulation system despite a delay τ that is random and unknown. As shown in Equations 13-17, the feedback signal sign component sgn(x(ϕ)) may be determined based on the complex value $x_1(\phi,\tau)$, the complex value $x_2(\phi,\tau)$, and the dither frequency ratio m/n.

As noted above, the result of a signum function sgn(z) should equal ±1 so long as z is real. However, as a practical matter, a precise value of ±1 may not be obtained based on the determining at 1060 due to noise signals. Accordingly, the determining at 1060 may include rounding of the result, such that the feedback signal sign component sgn(x(ϕ)) is rounded either to the nearest of +1 or −1.

At 1070, the method 1000 generates a feedback signal 679 based on the feedback signal magnitude component |x(ϕ)| determined at 1050 and the feedback signal sign component sgn(x(ϕ)) determined at 1060.

As noted above, a reconstructed feedback signal x(ϕ) may be expressed as a product of the feedback signal magnitude component |x(ϕ)| and the feedback signal sign component sgn(x(ϕ)), as shown in Equation 17:

$$x(\phi) = |x(\phi)| * \text{sgn}(x(\phi)). \quad \text{Eq. (17)}$$

As shown in Equation 9, the feedback signal magnitude component |x(ϕ)| may be determined based on the complex value $x_1(\phi,\tau)$, and as shown in Equation 11, the feedback signal sign component sgn(x(ϕ)) may be determined based on the complex value $x_1(\phi,\tau)$, the complex value $x_2(\phi,\tau)$, and the components of the dither frequency ratio m/n. Accordingly, the generating at 1070 may be performed as shown in Equation 18:

$$x(\phi) = |x_1(\phi, \tau)| * \frac{\text{sgn}(x_1(\phi, \tau))^m}{\text{sgn}(x_2(\phi, \tau))^n}. \quad \text{Eq. (18)}$$

At 1080, the method 1000 transmits the feedback signal 679 generated at 1070 to a modulation circuit 650. For example, the feedback signal 679 may be transmitted to a bias control circuit of the modulation circuit 650. The feedback signal generated at 1070 may be analogous to the feedback signal 679 depicted in FIG. 6. The transmitting at

1080 may be performed by, for example, the asynchronous detector circuit 670 depicted in FIG. 6.

The method 900 and method 1000 depicted in FIG. 9 and FIG. 10, respectively, utilize a second dither signal 612 (generated at 920) having the form shown in Equation 6, as noted previously:

$$d_2(t) = A_2 \cos(\omega_2 t) \qquad \text{Eq. (6)}$$

If the second dither signal 612 takes this form, then the second correlation result (obtained at 1040) may take the form shown in Equation 10:

$$x_2(\phi, \tau) = A_2 \sin 2\phi e^{-j\omega_2 \tau}. \qquad \text{Eq. (10)}$$

However, the second dither signal 612 may take alternative forms unlike the form shown in Equation 6. For example, the second dither signal 612 may take the form shown in Equation 19:

$$d_2(t) = A_2 \left[ \frac{1 + m_2 \cos(\omega_2 t + \varphi_2)}{2} \right] \cos(\omega_c t + \varphi_c). \qquad \text{Eq. (19)}$$

The second dither signal 612 shown in Equation 19 may be referred to as an amplitude-modulated dither tone having a carrier frequency $\omega_c$ and a carrier phase $\phi_c$. If a modulation index $m_2$ is set to one and a second dither phase $\phi_2$ is set to zero, then the second correlation result (obtained at 1040) may take the form shown in Equation 20:

$$x_2(\phi, \tau) = \frac{A_2^2}{4} \cos 2\phi e^{-j\omega_2 \tau}. \qquad \text{Eq. (20)}$$

It can be shown that the second correlation result having the form shown in Equation 20 may also be used to generate the feedback signal sign component $\text{sgn}(x(\phi))$ at 1060. In particular, the feedback signal sign component $\text{sgn}(x(\phi))$ may be determined in accordance with Equation 21, wherein the first correlation result is raised to a first power and the second correlation result is raised to a second power:

$$\text{sgn}(x(\phi)) = \frac{\text{sgn}(x_1(\phi, \tau))^m}{\text{sgn}(x_2(\phi, \tau))^n} = \frac{[\text{sgn}(A_1 \sin 2\phi) e^{-j\omega_1 \tau}]^m}{\left[ \text{sgn}\left( \frac{A_2^2}{4} \cos 2\phi \right) e^{-j\omega_2 \tau} \right]^n}. \qquad \text{Eq. (21)}$$

As will be understood from Equation 21, the signum function may be applied to the first correlation result (in the numerator) and the second correlation result (in the denominator). In the numerator, application of the signum function may result in isolation of a first exponential $e^{-j\omega_1 \tau}$ from a first remainder, and in the denominator, application of the signum function may result in isolation of the second exponential $e^{-j\omega_2 \tau}$ from a second remainder. As will be further understood from Equation 21, the first exponential may be raised to a first power (equal to the numerator m of the dither frequency ratio m/n) and the second exponential may raised to a second power (equal to the denominator n of the dither frequency ratio m/n). To further simplify, the expression on the right-hand side of Equation 21 may be re-expressed as shown below in Equation 22:

$$\frac{[\text{sgn}(A_1 \sin 2\phi) e^{-j\omega_1 \tau}]^m}{\left[ \text{sgn}\left( \frac{A_2^2}{4} \cos 2\phi \right) e^{-j\omega_2 \tau} \right]^n} = e^{-j\tau(m\omega_1 - n\omega_2)} \frac{\text{sgn}(A_1 \sin 2\phi)^m}{\text{sgn}\left( \frac{A_2^2}{4} \cos 2\phi \right)^n}. \qquad \text{Eq. (22)}$$

Recall that the dither frequency ratio m/n may be defined in terms of the first frequency $\omega_1$ and the second frequency $\omega_2$, such that $\omega_2 = m/n * \omega_1$. Accordingly, the term $(m\omega_1 - n\omega_2)$ may equal zero, such that the complex value $e^{-j\tau(m\omega_1 - n\omega_2)}$ may be dropped. Therefore, Equation 22 may be further simplified as shown in Equation 23:

$$e^{-j\tau(m\omega_1 - n\omega_2)} \frac{\text{sgn}(A_1 \sin 2\phi)^m}{\text{sgn}\left( \frac{A_2^2}{4} \cos 2\phi \right)^n} = \frac{\text{sgn}(A_1 \sin 2\phi)^m}{\text{sgn}\left( \frac{A_2^2}{4} \cos 2\phi \right)^n}. \qquad \text{Eq. (23)}$$

It may now be observed that the expression is independent of the delay $\tau$. Accordingly, it will be understood that the feedback signal sign component $\text{sgn}(x(\phi))$ may be determined independently of the delay $\tau$. Moreover, all remaining signum function arguments are real, thereby omitting potential noise terms. As will be understood from Equation 23, the first remainder may be raised to the first power (m, as noted above) and the second remainder may be raised to the second power (n, as noted above). As will be shown below, the feedback signal sign component $\text{sgn}(x(\phi))$ may be determined by dividing the raised first remainder by the raised second remainder.

Consider a scenario where n is selected as an integer. Note that, by contrast to the previous scenario, in which n was selected as an even integer, the present scenario only requires that n be an integer. Because of the nature of the cosine function, wherein $\cos(z) = \cos(-z)$ for the region of interest $-\pi/2 < z < \pi/2$, it will be understood that when the signum function is applied to the second remainder, the result will be equal to +1. Accordingly, Equation 14 may be further simplified as shown in Equation 24:

$$\frac{\text{sgn}(A_1 \sin 2\phi)^m}{\text{sgn}\left( \frac{A_2^2}{4} \cos 2\phi \right)^n} = \text{sgn}(A_1 \sin 2\phi)^m. \qquad \text{Eq. (24)}$$

Next, consider a scenario where m is selected as an odd integer. Because the expression on the right-hand side of Equation 24 is raised to the power of m (with m being an odd integer), it will be understood that the sign of the expression will not change based on the value of m. Accordingly, Equation 24 may be further simplified as shown in Equation 25:

$$\text{sgn}(A_1 \sin 2\phi)^m = \text{sgn}(A_1 \sin 2\phi). \qquad \text{Eq. (25)}$$

A comparison of Equation 25 to Equation 4 shows that the feedback signal sign component $\text{sgn}(x(\phi))$ may be resolved in an asynchronous optical modulation system despite a delay $\tau$ that is random and unknown. As shown in Equations 31-35, the feedback signal sign component $\text{sgn}(x(\phi))$ may be determined based on the complex value $x_1(\phi, \tau)$, the complex value $x_2(\phi, \tau)$, and the components of the dither frequency ratio m/n.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electrical hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A transmitter, comprising:
   a drive circuit that supplies at least one drive signal, the drive circuit including:
   an adder that receives a first dither signal, a second dither signal, and a data, the adder adding the first and second dither signals to the data to provide a sum signal, and
   a digital to analog converter that receives the sum signal and outputs the at least one drive signal; and
   a modulation circuit that receives the at least one drive signal, the modulation circuit receiving light and outputting a modulated optical signal based on the at least one drive signal,
   the modulated optical signal being indicative of the first and second dither signals and the data, the first and second dither signals having first and second frequencies, respectively, and the data having an associated third frequency that is greater than the first and second frequencies, the first frequency being different than the second frequency.

2. The transmitter of claim 1, wherein the modulation circuit comprises two modulators.

3. The transmitter of claim 1, wherein the modulated optical signal includes an in-phase optical signal component and a quadrature optical signal component.

4. The transmitter of claim 1, wherein the first and second dither signals are sinusoidal tones having the first and second frequencies, respectively.

5. The transmitter of claim 1, further comprising a laser that supplies the light to the modulation circuit, wherein the light is continuous-wave light.

6. The transmitter of claim 1, wherein the modulation circuit comprises a Mach-Zehnder modulator.

7. The transmitter of claim 1, wherein the first and second frequencies are set such that $\omega_2 = m/n \cdot \omega_1$, wherein $\omega_1$ is the first frequency, $\omega_2$ is the second frequency, m is a numerator, and n is a denominator, wherein the numerator m is an odd integer and the denominator n is an even integer.

8. The transmitter of claim 1, wherein based on the plurality of electrical signals, the modulation circuit further outputs an optical data signal component associated with the electrical data signal.

9. A transmitter, comprising:
   a drive circuit that supplies at least one drive signal, the drive circuit including:
   an adder that receives a first dither signal, a second dither signal, and a data, the adder adding the first and second dither signals to the data to provide a sum signal, and
   a digital to analog converter that receives the sum signal and outputs the at least one drive signal;
   a modulation circuit that receives the at least one drive signal, the modulation circuit receiving light and outputting a modulated optical signal based on the at least one drive signal,
   the modulated optical signal being indicative of the first and second dither signals and the data, the first and second dither signals having first and second frequencies, respectively, and the data having an associated third frequency that is greater than the first and second frequencies, the first frequency being different than the second frequency; and
   a photodetector that detects a portion of the modulated optical signal; and
   a detector circuit that supplies a feedback signal that is supplied to the modulation circuit.

10. The transmitter of claim 9, wherein the modulation circuit comprises two modulators, and the modulated optical signal includes an in-phase optical signal component and a quadrature optical signal component.

11. The transmitter of claim 9, wherein the modulation circuit comprises a Mach-Zehnder modulator.

12. The transmitter of claim 9, wherein the first and second frequencies are set such that $\omega_2=m/n*\omega_1$, wherein $\omega_1$ is the first frequency, $\omega_2$ is the second frequency, m is a numerator, and n is a denominator, wherein the numerator m is an odd integer and the denominator n is an even integer.

13. A transmitter, comprising:
a drive circuit that supplies at least one drive signal;
a modulation circuit that receives the at least one drive signal, the modulation circuit receiving light and outputting a modulated optical signal based on the at least one drive signal,
the modulated optical signal carrying first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer; and
a photodetector that detects a portion of the modulated optical signal; and
a detector circuit that supplies a feedback signal that is supplied to the modulation circuit, wherein the drive circuit supplies a plurality of electrical signals such that based on the plurality of electrical signals, a detector circuit supplies a feedback signal by:
determining a feedback signal magnitude component that is independent of a delay associated with the drive circuit and the modulator circuit;
determining a feedback signal sign component that is independent of the delay associated with the drive circuit and the modulator circuit;
generating the feedback signal based on the feedback signal magnitude component and the feedback signal sign component;
and transmitting the feedback signal to the modulator circuit.

14. A transmitter, comprising:
an adder that receives a first dither signal, a second dither signal, and a data, the adder adding the first and second dither signals to the data to provide a sum signal, and
a digital to analog converter that receives the sum signal and outputs at least one drive signal;
a modulation circuit that receives the at least one drive signal, the modulation circuit receiving light and outputting a modulated optical signal based on the at least one drive signal,
the modulated optical signal being indicative of the first and second dither signals and the data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer; and
a photodetector that detects a portion of the modulated optical signal; and
a detector circuit that supplies a feedback signal that is supplied to the modulation circuit, wherein the feedback signal generated is based on a first optical signal component associated with the first frequency and a second optical signal component associated with the second frequency,
wherein the modulator circuit adjusts a transmission point of the modulator circuit based on the feedback signal.

15. The transmitter of claim 14, wherein the modulation circuit comprises a Mach-Zehnder modulator.

16. The transmitter of claim 14, wherein the first and second frequencies are set such that $\omega_2=m/n*\omega_1$, wherein $\omega_1$ is the first frequency, $\omega_2$ is the second frequency, m is a numerator, and n is a denominator, wherein the numerator m is an odd integer and the denominator n is an even integer.

17. The transmitter of claim 14, wherein the feedback signal indicates a bias of the transmission point of the modulator circuit.

18. A transmitter, comprising:
a modulation circuit that receives at least one drive signal, the modulation circuit receiving light and outputting a modulated optical signal based on the at least one drive signal,
the modulated optical signal carrying first and second dither signals and a data, the first and second dither signals having first and second frequencies, respectively, and the data having an associated third frequency that is greater than the first and second frequencies, the first frequency being different than the second frequency such that a ratio of the first frequency to the second frequency is substantially equal to a ratio of a first integer to a second integer; and
a photodetector that detects a portion of the modulated optical signal; and
a detector circuit that supplies a feedback signal that is supplied to the modulation circuit, wherein the feedback signal generated is based on a first optical signal component associated with the first frequency and a second optical signal component associated with the second frequency,
wherein the modulator circuit adjusts a transmission point of the modulator circuit based on the feedback signal,
wherein the detector circuit supplies the feedback signal by:
determining a feedback signal magnitude component that is independent of a delay associated with the drive circuit and the modulator circuit;
determining a feedback signal sign component that is independent of the delay associated with the drive circuit and the modulator circuit;
generating the feedback signal based on the feedback signal magnitude component and the feedback signal sign component; and
transmitting the feedback signal to the modulator circuit.

19. The transmitter of claim 18, wherein the detector circuit generates a plurality of complex values based on the photocurrent, wherein each of the plurality of complex values is generated by:
multiplying the photocurrent by $\cos(\omega t)$ and integrating the result over a correlation period to obtain a first integration result, wherein $\omega$ is a demodulation frequency and t is time;
multiplying the photocurrent by $\sin(\omega t)$ and integrating the result over the correlation period to obtain a second integration result; and
summing (i) the first integration result and (ii) the product of imaginary number j and the second integration result, wherein a first complex value $x_1$ of the plurality of complex values is generated by setting the demodulation frequency to the first frequency $\omega_1$ and a second complex value $x_2$ of the plurality of complex values is generated by setting the demodulation frequency to the second frequency $\omega_2$.

20. The transmitter of claim 19, wherein the feedback signal sign component is determined in accordance with the following equation:

$$\mathrm{sgn}(x(\phi)) = \frac{\mathrm{sgn}(x_1)^m}{\mathrm{sgn}(x_2)^n};$$

wherein $\mathrm{sgn}(x(\phi))$ is the feedback signal sign component, $x_1$ is the first complex value, $x_2$ is the second complex value, m is a numerator of a dither frequency ratio, and n is a denominator of the dither frequency ratio, the first frequency $\omega_1$ and the second frequency $\omega_2$ being set based on the dither frequency ratio such that $\omega_2 = m/n * \omega_1$.

* * * * *